United States Patent
Kraus et al.

(10) Patent No.: US 10,123,488 B2
(45) Date of Patent: Nov. 13, 2018

(54) VARIABLE RATE DISCHARGE SYSTEM FOR CROP ACCUMULATOR

(71) Applicant: Deere & Company, Moline, IL (US)

(72) Inventors: Timothy J. Kraus, Blakesburg, IA (US); Henry D. Anstey, Ottumwa, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 15/398,030

(22) Filed: Jan. 4, 2017

(65) Prior Publication Data

US 2017/0112069 A1 Apr. 27, 2017

Related U.S. Application Data

(62) Division of application No. 14/333,545, filed on Jul. 17, 2014, now Pat. No. 9,578,811.

(51) Int. Cl.
*A01F 15/08* (2006.01)
*A01F 15/07* (2006.01)
*A01D 85/00* (2006.01)

(52) U.S. Cl.
CPC ........ *A01F 15/0883* (2013.01); *A01D 85/005* (2013.01); *A01F 15/0765* (2013.01); *A01F 15/0875* (2013.01); *A01D 2085/007* (2013.01); *A01D 2085/008* (2013.01)

(58) Field of Classification Search
None
See application file for complete search history.

(56) References Cited

U.S. PATENT DOCUMENTS

| | | | |
|---|---|---|---|
| 3,163,302 A | 12/1964 | Pridgeon | |
| 4,183,197 A * | 1/1980 | Kucera | A01F 15/0765 56/341 |
| 4,310,275 A * | 1/1982 | Hoelscher | A01D 85/005 414/111 |

(Continued)

FOREIGN PATENT DOCUMENTS

| | | |
|---|---|---|
| AU | 568143 B2 | 12/1987 |
| CA | 2709397 A1 | 5/2000 |

(Continued)

OTHER PUBLICATIONS

Martensen, Machine translation of DE-102011122151-B4, Jan. 2014, IP.com (Year: 2014).*

*Primary Examiner* — David P. Merlino

(57) ABSTRACT

A system for controlling the speed of harvested crop as it is discharged from a crop accumulator onto a field comprising a discharge mechanism for imparting a desired rearward travel speed to the harvested crop as it is being discharged from the crop accumulator and a speed measurement device for measuring forward travel speed of the crop accumulator. A processor is in communication with the discharge mechanism and the speed measurement device and is operable to adjust the discharge mechanism for imparting the desired rearward travel speed or the forward travel speed of the crop accumulator, to discharge harvested crop with a rearward travel speed that is substantially equal to the forward travel speed such that the harvested crop has a substantially net zero speed as it contacts the ground.

10 Claims, 13 Drawing Sheets

(56) References Cited

U.S. PATENT DOCUMENTS

| | | |
|---|---|---|
| 7,000,533 B2 | 2/2006 | Derscheid et al. |
| 7,401,547 B2 | 7/2008 | Degen |
| 2006/0086263 A1* | 4/2006 | Degen ................. A01F 15/0875 100/88 |
| 2010/0242747 A1* | 9/2010 | Kraus .................. A01F 15/101 100/35 |
| 2014/0003888 A1* | 1/2014 | Dux ..................... A01D 90/083 414/24.5 |
| 2015/0216125 A1* | 8/2015 | Olander .............. A01F 15/0883 701/50 |
| 2016/0084374 A1* | 3/2016 | Kim ....................... F16H 61/68 701/51 |

FOREIGN PATENT DOCUMENTS

| | | | | |
|---|---|---|---|---|
| DE | 102011122151 A1 * | 6/2013 | ........... | A01F 15/071 |
| EP | 0350537 A1 * | 1/1990 | ........... | A01D 85/005 |
| EP | 3199016 A1 * | 8/2017 | ........... | A01F 15/071 |
| FR | 2679410 A1 | 1/1993 | | |
| FR | 2751506 A1 * | 1/1998 | ........... | A01D 85/005 |
| GB | 2245878 A * | 1/1992 | ........... | A01F 15/071 |
| JP | 2003143927 A | 5/2003 | | |
| PL | 158422 B1 | 9/1992 | | |

\* cited by examiner

VARIABLE RATE DISCHARGE SYSTEM FOR CROP ACCUMULATOR

CROSS REFERENCE TO RELATED APPLICATIONS

This patent application is a divisional of U.S. application Ser. No. 14/333,545, titled Variable Rate Discharge System for Crop Accumulator, filed Jul. 17, 2014, which is hereby incorporated by reference in its entirety.

FIELD OF THE DISCLOSURE

The present disclosure generally relates to crop harvesting systems. More particularly this disclosure relates to crop harvesting systems employing a harvester and an accumulator for accumulating crop. Specifically, the disclosure relates to such a system wherein a variable rate discharge system is provided for depositing crop material at predetermined location(s).

BACKGROUND OF THE DISCLOSURE

In order to deposit a crop material, in bale form, from an accumulator onto a field, it is common to stop the accumulator and discharge the crop material onto the field in a random fashion. If bales are dropped on the go, the bales have a tendency to roll and could even roll down a hill. This requires a subsequent operator to drive all over the field to collect and relocate the bales to the final storage location.

SUMMARY OF THE DISCLOSURE

In one embodiment, a system for controlling the speed of harvested crop as it is discharged from a crop accumulator onto a field is disclosed. The system comprises a discharge mechanism for imparting a desired rearward travel speed to the harvested crop as it is being discharged from the crop accumulator. The system also comprises a speed measurement device for measuring forward travel speed of the crop accumulator. A processor is in communication with the discharge mechanism and the speed measurement device. The processor is operable to adjust the discharge mechanism for imparting the desired rearward travel speed or the forward travel speed of the crop accumulator, to discharge harvested crop with a rearward travel speed that is substantially equal to the forward travel speed such that the harvested crop has a substantially net zero speed as it contacts the ground.

In another embodiment, a system for controlling the speed of harvested crop as it is discharged from a crop accumulator onto a field is disclosed. The system comprises a discharge mechanism for imparting a rearward travel speed to the harvested crop as it is being discharged from the crop accumulator. The system also comprises a speed measurement device for measuring forward travel speed of the crop accumulator. The system alerts an operator to adjust the discharge mechanism to impart the rearward travel speed or the forward travel speed of the crop accumulator, to discharge harvested crop with a rearward travel speed that is proportional to the forward travel speed or substantially equal to the forward travel speed, such that the harvested crop has a substantially net zero speed as it contacts the ground.

In yet another embodiment, a system for controlling the speed of harvested crop as it is discharged from a crop accumulator onto a field is disclosed. The system comprises a discharge mechanism for imparting a desired rearward travel speed to the harvested crop as it is being discharged from the crop accumulator. The system comprises a speed measurement device for measuring forward travel speed of the crop accumulator. The system comprises a GPS unit configured with at least one virtual trip line. A processor is in communication with the discharge mechanism, the speed measurement device, and the GPS unit. The processor is operable to adjust at least one of the discharge mechanism for imparting the desired rearward travel speed and the forward travel speed of the crop accumulator, to discharge harvested crop with a rearward travel speed that is one of proportional to the forward travel speed and substantially the same as the forward travel speed, such that the harvested crop contacts the ground according to at least one of the following: on the virtual trip line, adjacent to the virtual trip line, in a zone defined by a predetermined distance from the virtual trip line, and outside of a zone defined by a predetermined distance from the virtual trip line.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
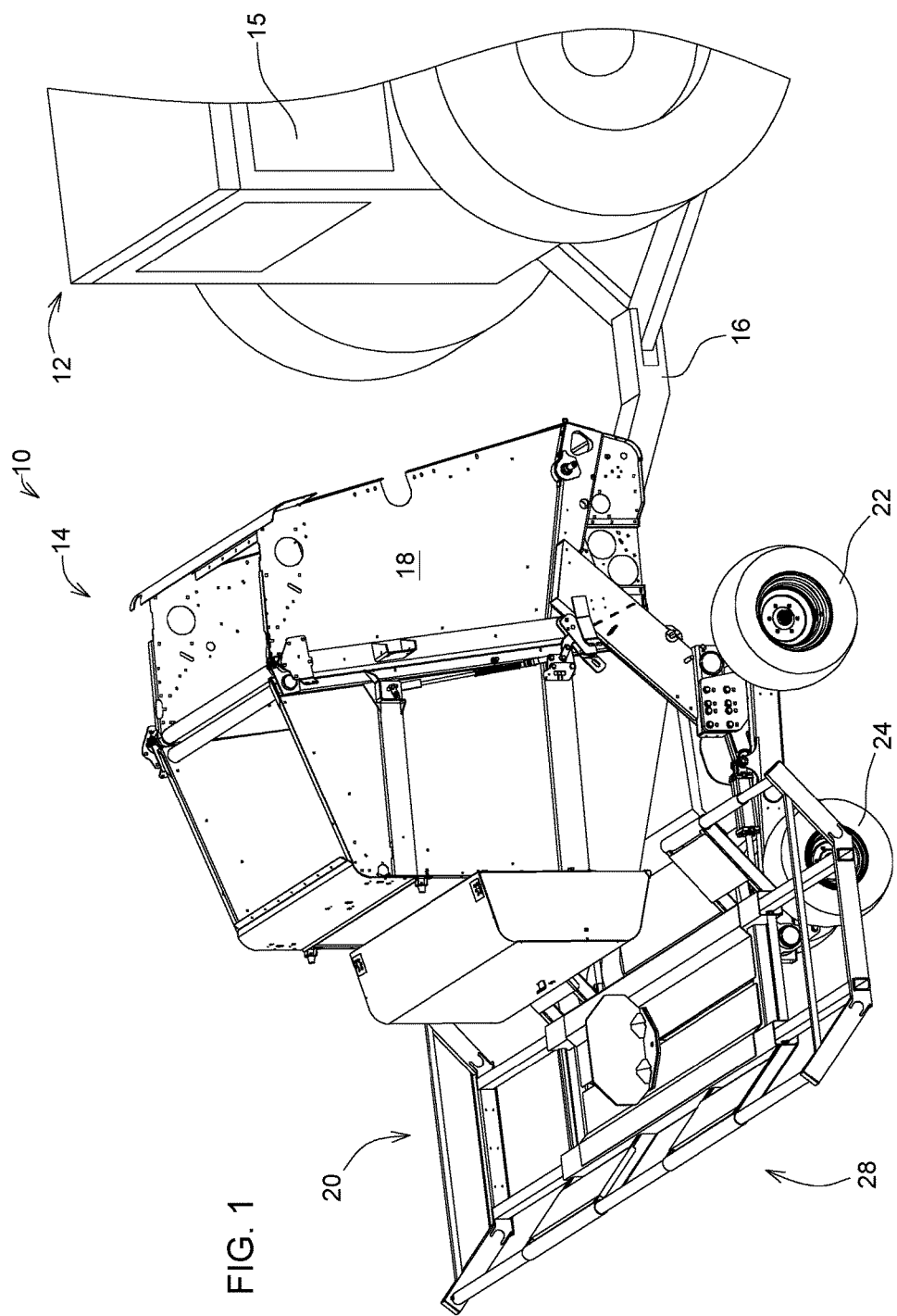
FIG. 1 is a perspective view of a crop harvesting system including one embodiment of a system for controlling the speed of harvested crop as it is discharged.
Figure 2:
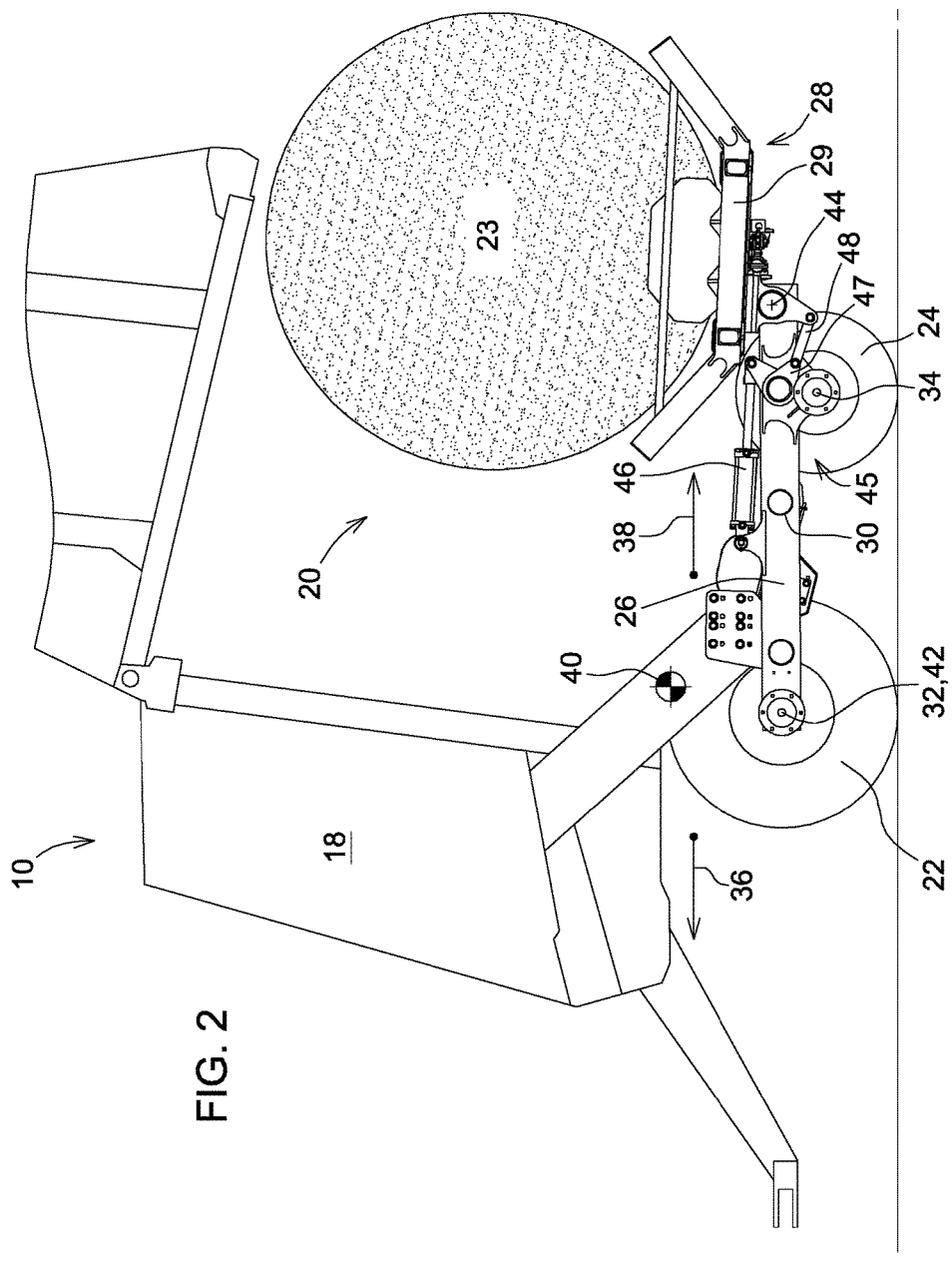
FIG. 2 is a side view of the crop harvesting system of FIG. 1 with some parts removed.

FIG. 1 illustrates a baling system 10 comprising a tractor 12 and a baler 14. The tractor includes an operator station 15. The baler 14 is connected to the tractor 12 via a hitch 16 thereby providing towing for the movement of the baler 14. The baler 14 includes a baler mechanism 18, a crop accumulator 20, and at least one ground engaging support 22. With reference to FIG. 2, the baler mechanism 18 receives crop material as the baling system 10 traverses the ground and forms a bale 23 from the crop material.

With continued reference to FIG. 2, the crop accumulator 20 includes at least one ground engaging support 24, structural members 26, and a discharge mechanism 28. The discharge mechanism 28 is shown as a bale carriage 29. The ground engaging supports 22, 24 may be in the form of wheels and axles as illustrated or in some other form (e.g., a track system). The structural members 26 may be in the form of a beam and may be referred to as a walking beam construct. The baler mechanism 18 is connected to structural members 26 at baler connections 30, thereby transferring most of the weight of the baler mechanism 18 to the structural members 26. The structural members 26 are pivotally coupled to the ground engaging support 22 about a pivotal axis 32. The ground engaging support 24 is rotationally coupled to the structural members 26 about a rotational axis 34. The baler connection 30 is shown located between the pivotal axis 32 and the rotational axis 34. More specifically, the baler connection 30 is located in a fore direction 36 from rotational axis 34 and generally in an aft direction 38 of pivotal axis 32. Alternatively, the baler connection 30 may be in line with, generally in line with, or proximate the pivotal axis 32. The baler connection 30 is a pivoting connection although it is also contemplated that baler connection 30 could also be a non-pivoting connection.

The baler 14 is supported primarily by way of the ground engaging supports 22, 24 with the weight of the baler mechanism 18 being transferred to the structural members 26 by way of the baler connection 30. In the present embodiment, the Center of Gravity ("CG") 40 of the baler mechanism 18 is generally in line with the pivotal axis 32 and the CG 40 will shift as the amount of crop material increases in the baler mechanism 18 and as the baler mechanism 18 discharges the bale 23 onto the bale carriage 29. The structural members 26 function as walking beams with the weight of the baler mechanism 18 used to counteract the weight of the bale(s) 23 on the bale carriage 29. The CG 40 is generally fore of the baler connection 30. This arrangement effectively eliminates an upward force being transmitted through the baler connection 30 which thereby eliminates the potential upward force that would occur at the hitch 16 as bales 23 are formed and discharged to the bale carriage 29 and ultimately to the ground if the baler connection 30 were not there.

Although the baler connection 30 is shown apart from the pivotal axis 32, it is also contemplated that the baler connection 30 may be proximate to the pivotal axis 32. Further, the pivotal axis 32 is shown as being coaxial with a rotational axis 42 of the ground engaging support 22. However, it is also contemplated that the pivotal axis 32 may be generally proximate to the rotational axis 42, but not coaxially located.

Figure 12:
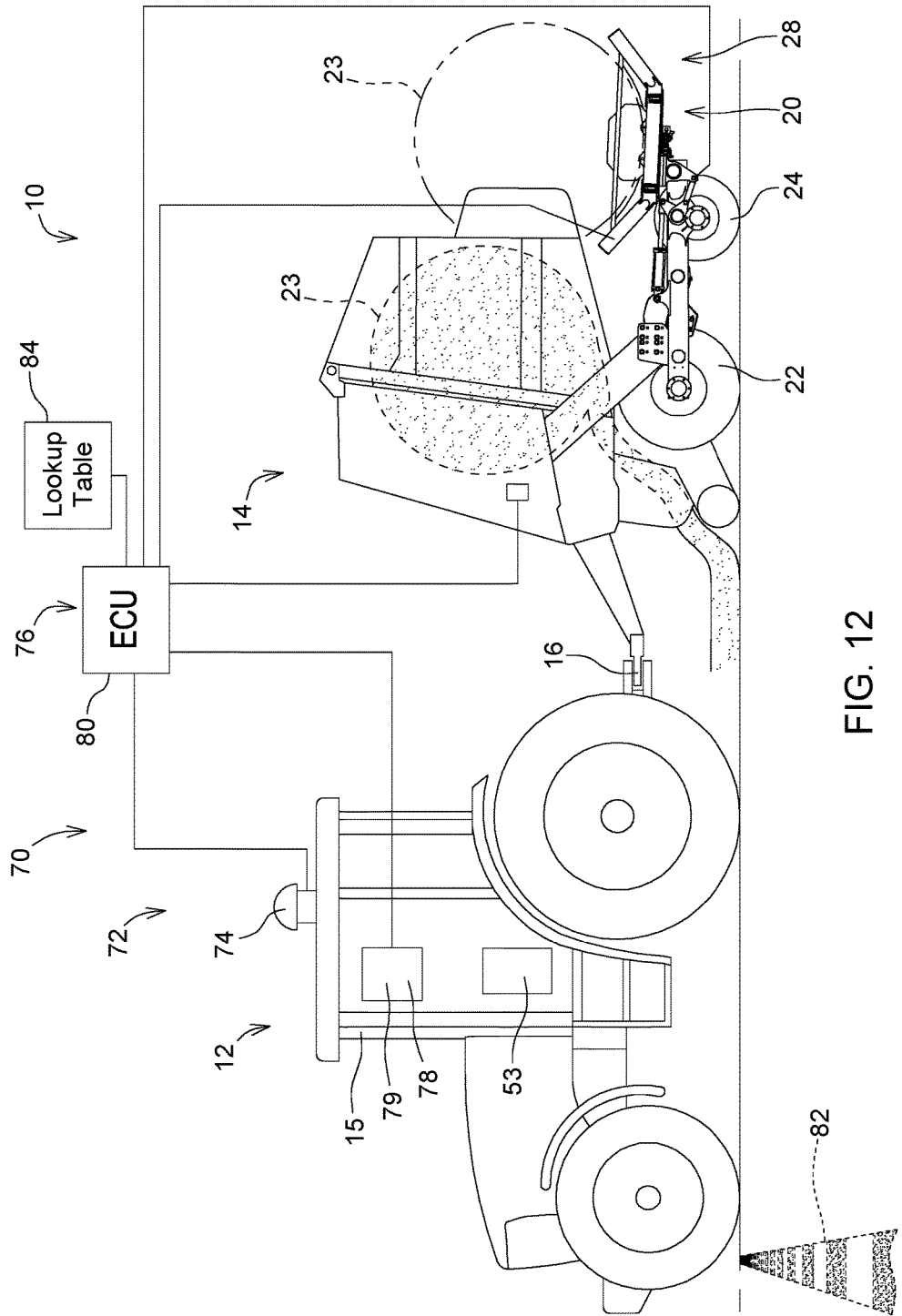
FIG. 12 is a partial schematic side view of the crop harvesting system of FIG. 1.
Figure 13:
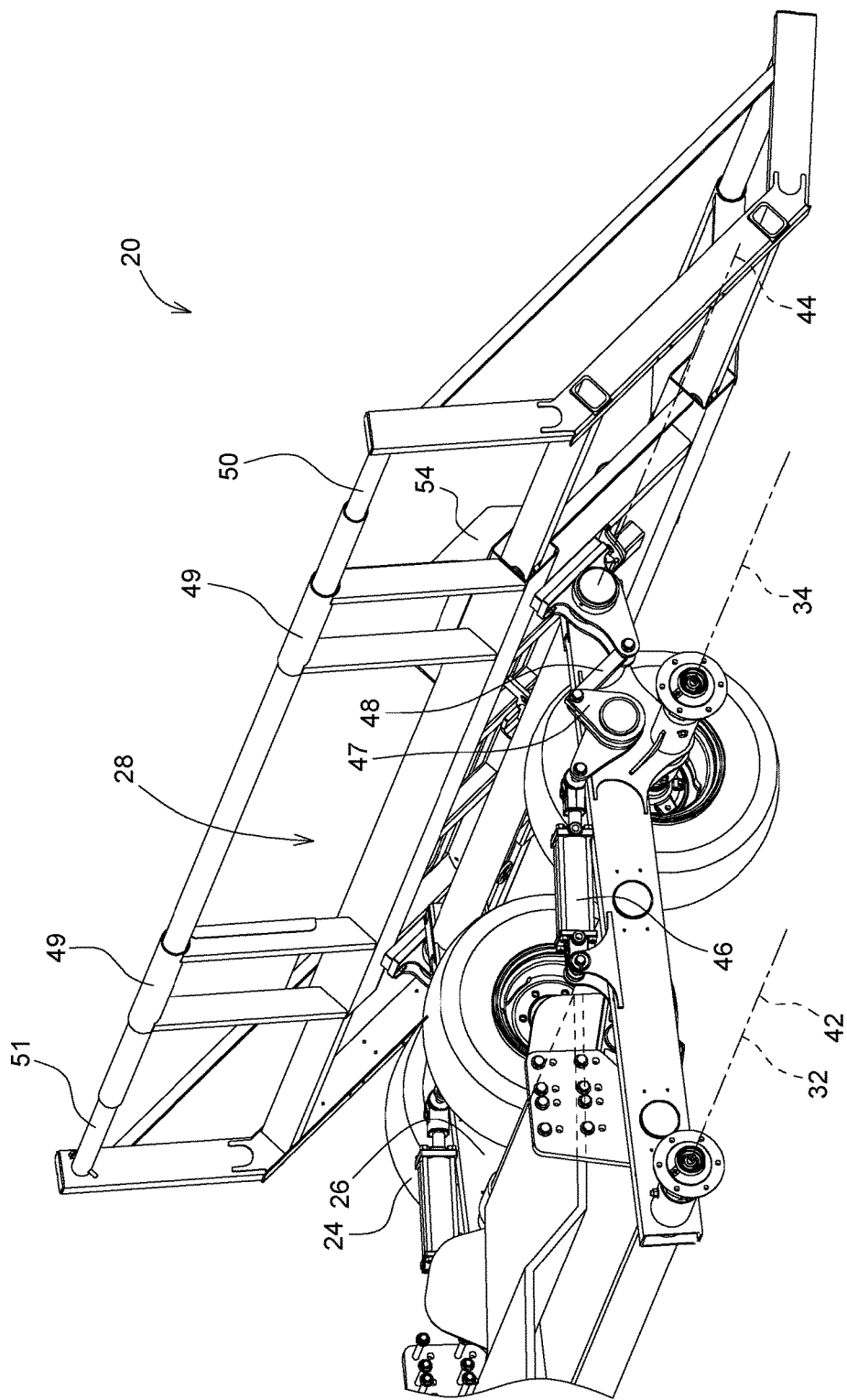
FIG. 13 is a partial perspective view of a crop accumulator of FIG. 1 with some parts removed.

The bale carriage 29 is pivotally connected to the structural members 26 about a carriage axis 44 to thereby allow the bale carriage 29 to pivot to dump the bales 23 that are carried thereby (FIG. 13). The bale carriage 29 is moved by a movement device 45. The movement device 45 may be controlled by a manually adjustable control 53 (FIG. 12) (e.g., hydraulic control valve) or may be controlled electrically, or pneumatically. The movement device 45 comprises an actuator 46. The actuator 46 may be hydraulic, pneumatic, electric, or other actuator. The actuator 46 is operable to move a pivot arm 47. The pivot arm 47 is operable to move a connector link 48 that is operable to move the bale carriage 29 about the carriage axis 44. Other movement devices 45 are contemplated by this disclosure (e.g., electronic actuator directly connected to the bale carriage 29). The axes 32, 34, 42 and 44 are each shown as substantially parallel to each other and being normal to the view shown in FIG. 2.

Figure 3:
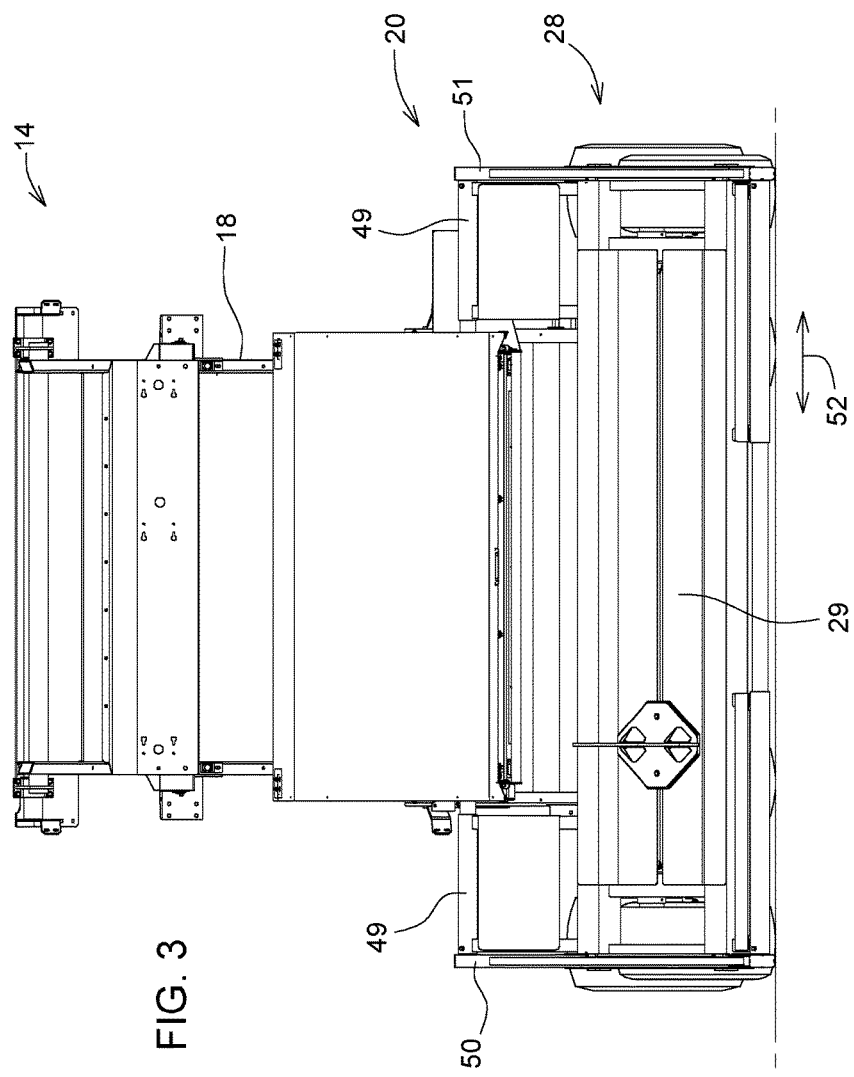
FIG. 3 is a rear view of the crop harvesting system of FIG. 1.

Referring to FIG. 3, there is shown a rear view of the baler 14, with the bale carriage 29 in a retracted mode ready for travel down a road, or prior to any bales 23 (FIG. 2) being formed and placed on the bale carriage 29. The bale carriage 29 has a fixed section 49 and two extending sections 50, 51, which extend/retract along a direction 52. The direction 52 is substantially normal to the fore direction 36 (FIG. 2), with the fore direction 36 being a travel direction for the baler 14. The extending sections 50, 51 are shown retracted within portions of the fixed section 49. Although it is also contemplated that parts of the extending sections 50, 51 could also envelop portions of the fixed section 49, when in the retracted state. The interaction of the extending sections 50, 51 with the fixed section 49 is such that a telescoping relationship exists as well as a nesting relationship as can be seen in subsequent figures.

Figure 4:
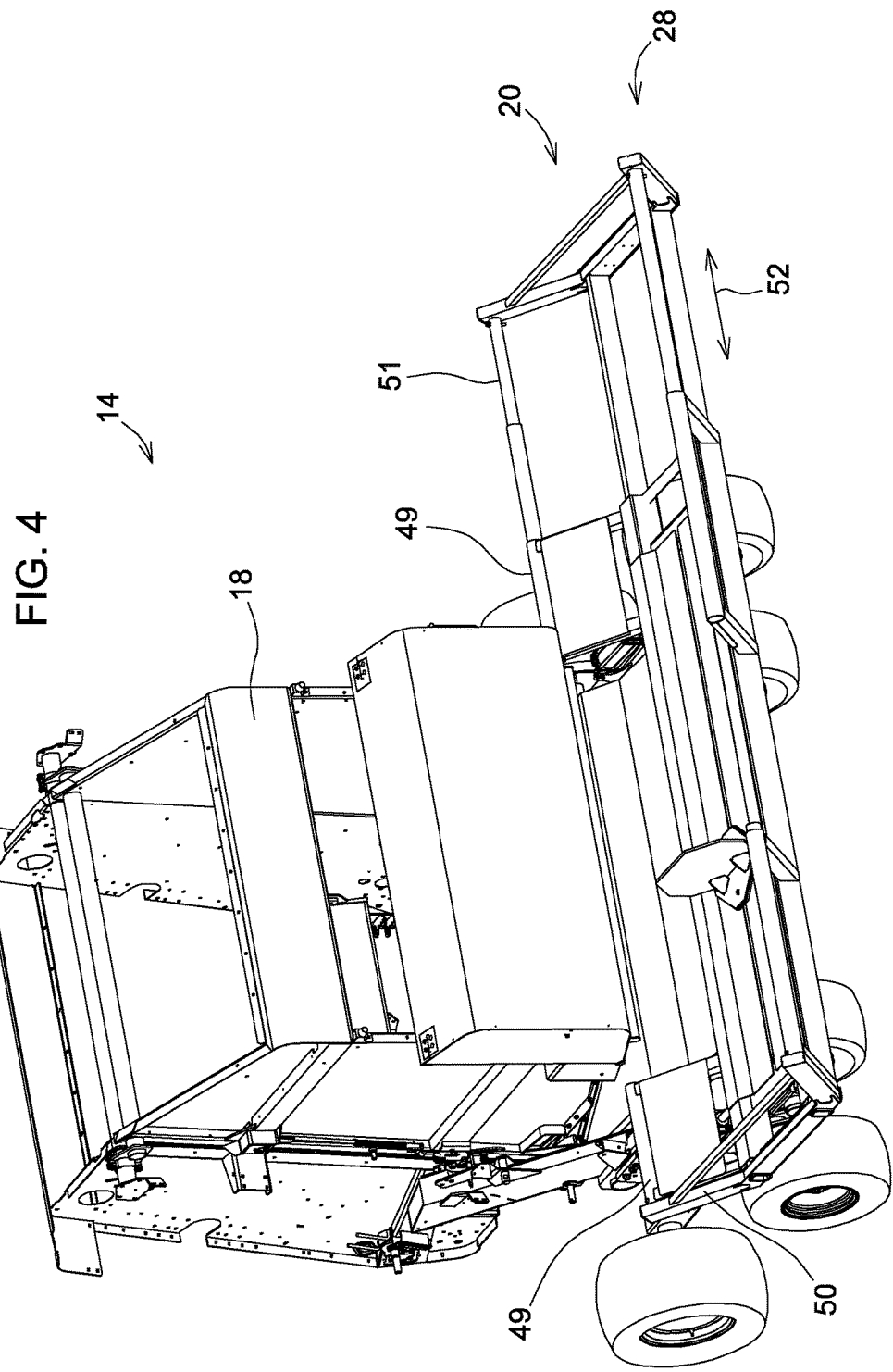
FIG. 4 is a rear perspective view of the crop harvesting system of FIG. 1 showing an extending section in an extended mode.

With reference to FIG. 4, there is shown a view of the baler 14 with the extending section 51 in an extended mode and the extending section 50 in a retracted mode. Although the fixed section 49 is referred to as fixed, it nonetheless pivots along with the extending sections 50, 51 with the rest of the bale carriage 29 about the carriage axis 44 (FIG. 2).

Figure 5:
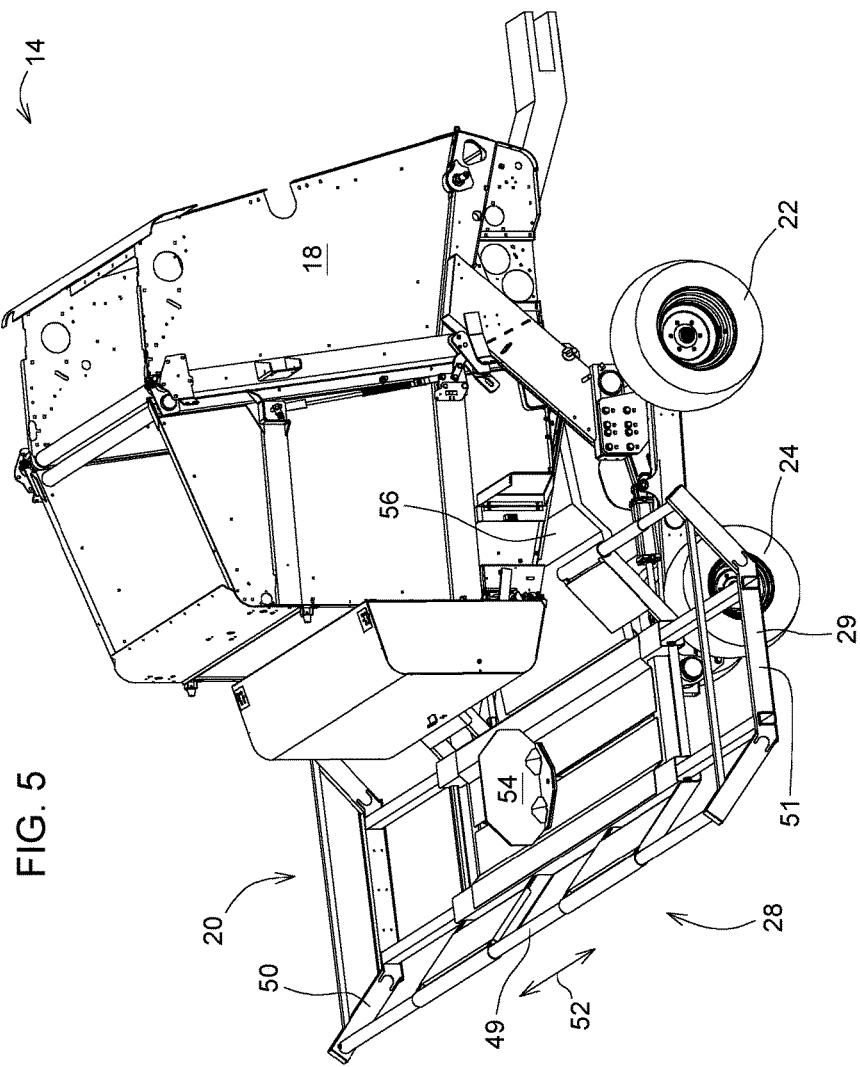
FIG. 5 is a perspective view of the crop harvesting system of FIG. 1.

Referring to FIG. 5, there is shown a sliding mechanism 54 and a platform 56. The sliding mechanism 54 is configured to slide a bale 23 along the direction 52. The sliding mechanism 54 is operable to move a bale 23 in the appropriate direction so that the bale 23 ends up substantially supported on either extending section 50, 51. The control of the sliding mechanism 54 is coordinated with the movement of a bale 23 onto the bale carriage 29 and operates to position a bale 23 on each of the extending sections 50, 51.

Figure 6:
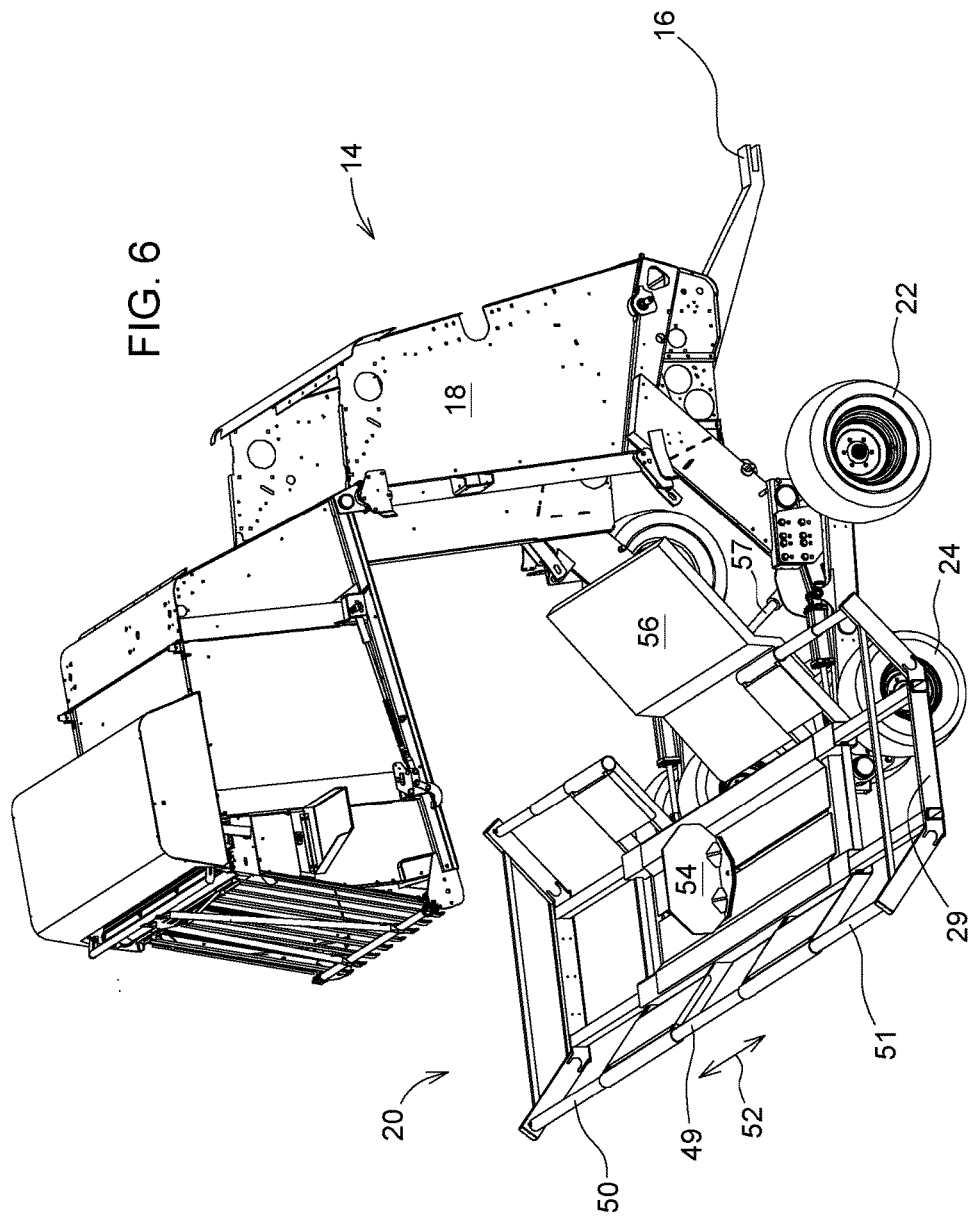
FIG. 6 is another perspective view of the crop harvesting system of FIG. 1 showing the baler mechanism in an open position without a bale.

The platform 56 is situated as being in a substantially flat orientation and is in position for a bale 23 to be dropped thereon by the baler mechanism 18. The platform 56 is tiltable via a movement device 57 (FIG. 6). The movement device 57 is an actuator shown as a hydraulic cylinder. Other movement devices 57 are contemplated by this disclosure (e.g., electronic actuator). The platform 56, which can also be thought of as a tilting table, receives a bale 23 and when the back portion of baler mechanism 18 opens, the platform 56 tilts and/or lifts the bale 23 in a generally aft direction 38 (FIG. 2) to move the bale 23 onto the bale carriage 29, as can be seen in some of the subsequent figures.

With reference to FIG. 6, there is shown another view of the sliding mechanism 54 and the platform 56. The platform 56 is shown tilted in a rearward direction and is configured to position a bale 23 so that it can be slid in a direction 52 without the side of the bale 23 getting caught on the fore part of the bale carriage 29. This is accomplished by positioning the platform 56 such that it pushes the bale 23 far enough back so that as the sliding mechanism 54 moves the bale 23. The bale 23 does not initially contact the fore part of the bale carriage 29. This may be considered a type of shingling maneuver so that the bale 23 proceeds along the bale carriage 29 without undue restriction.

Figure 7:
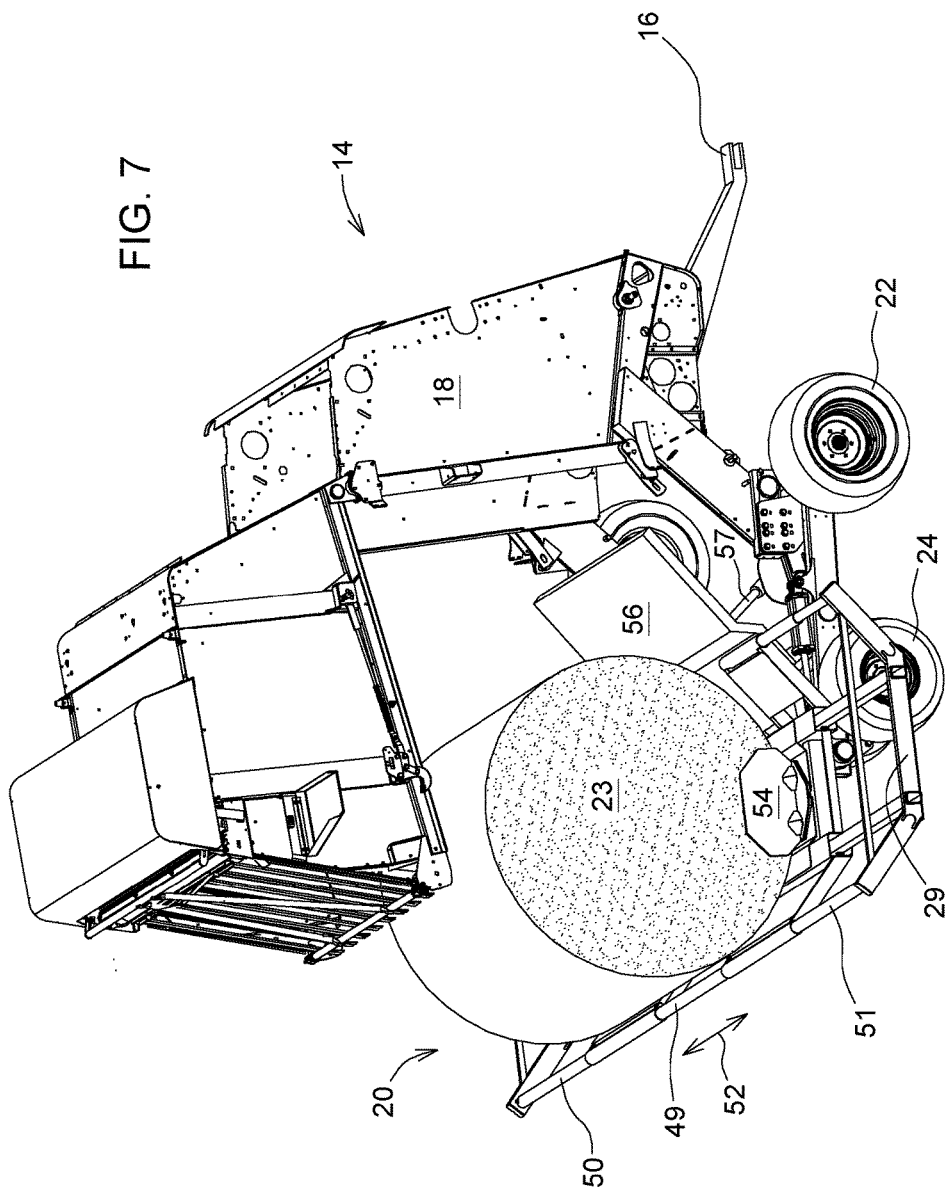
FIG. 7 is another perspective view of the crop harvesting system of FIG. 1 showing a bale being moved.
Figure 8:
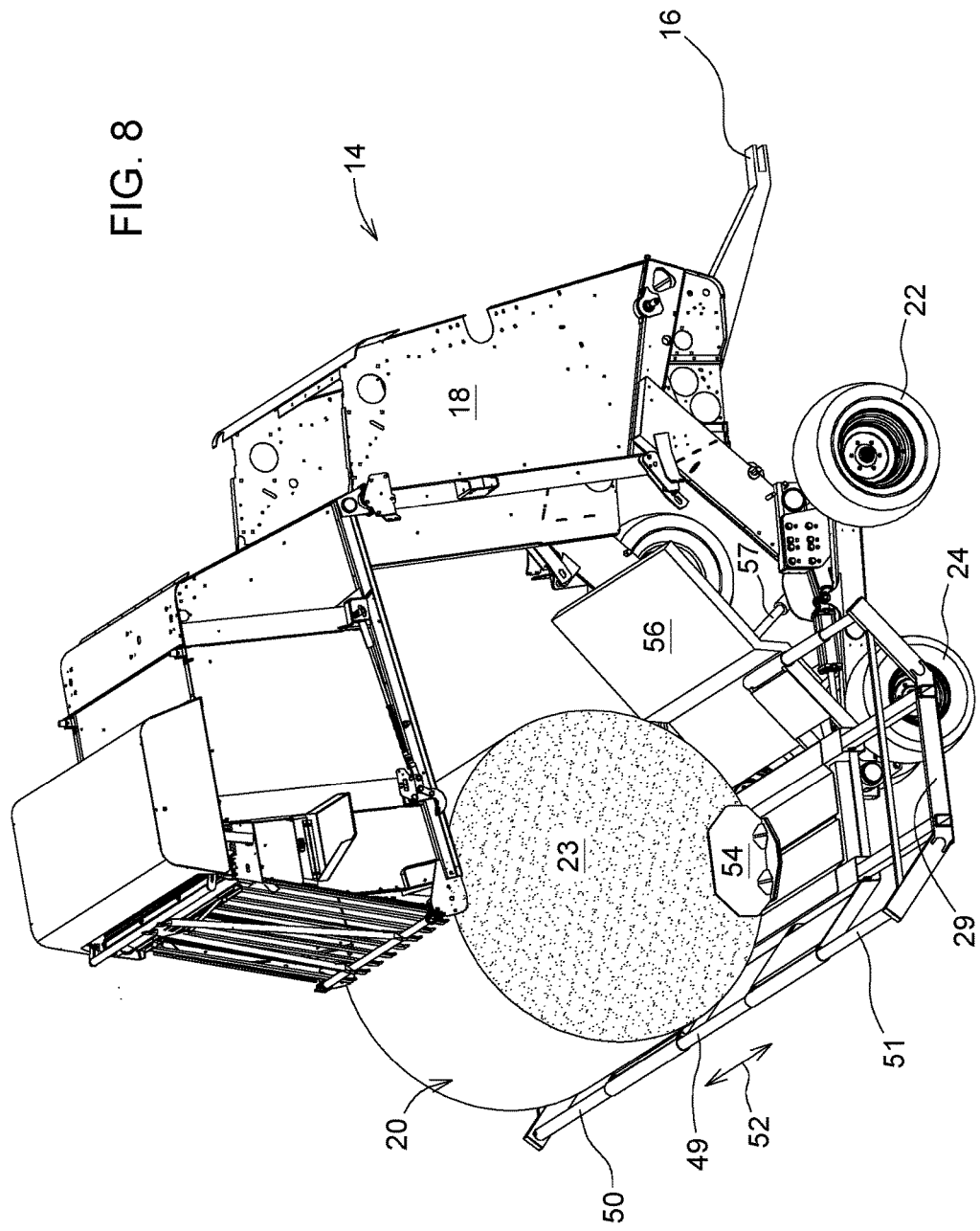
FIG. 8 is another perspective view of the crop harvesting system of FIG. 1 showing a bale being moved further.
Figure 9:
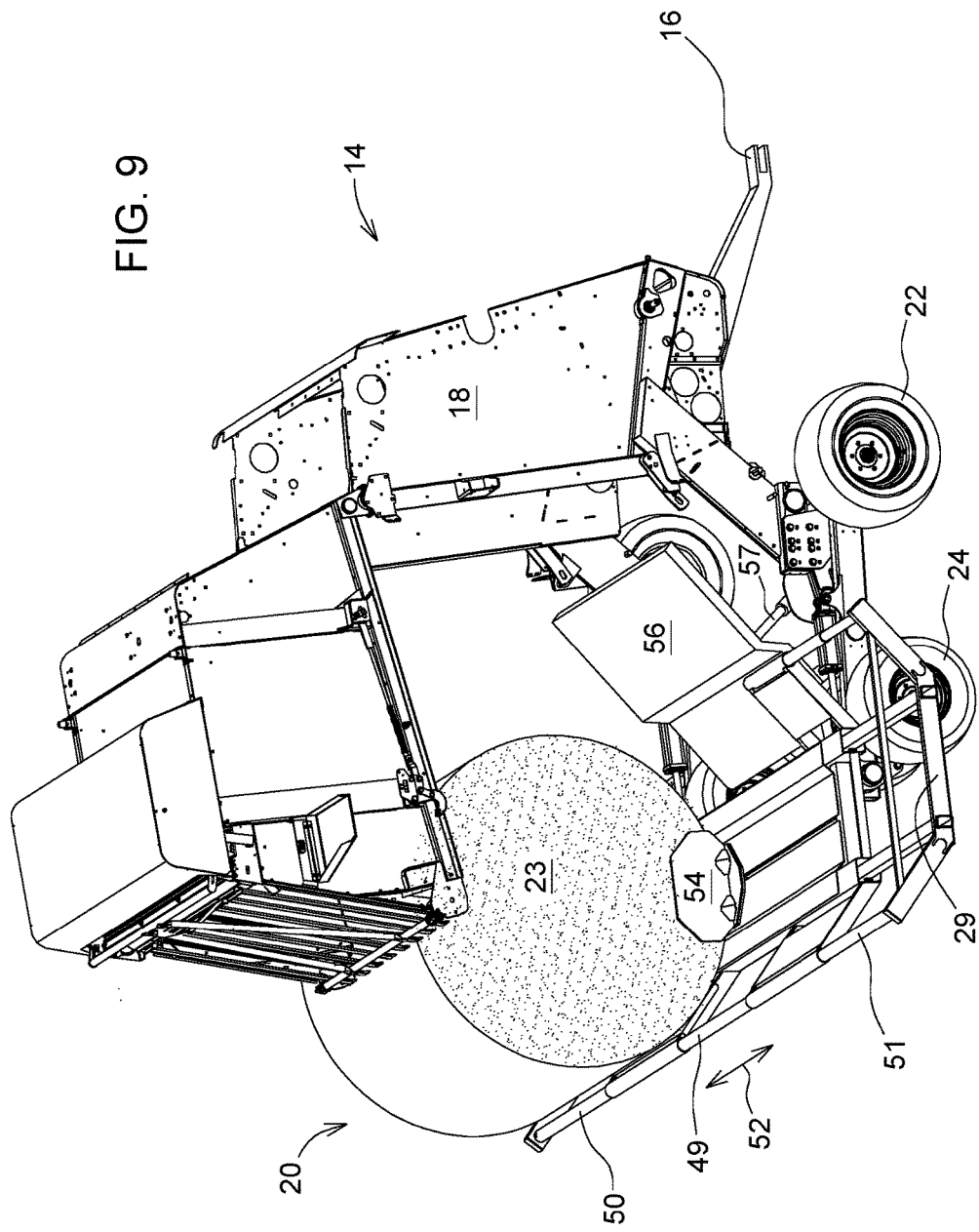
FIG. 9 is another perspective view of the crop harvesting system of FIG. 1 showing a bale being moved completely to the left.

Referring to FIGS. 7-9, there is shown a sequence of positions of the bale 23, as the bale 23 is positioned onto the bale carriage 29 by the platform 56 and moved by the sliding mechanism 54. Once the bale 23 is positioned, as shown in FIG. 9 the rear portion of the baler mechanism 18 is closed and another bale 23 is produced. When the next bale 23 is produced, the sliding mechanism 54 moves the bale 23 onto the extending section 51. When a third bale is produced, the platform 56 moves that bale onto the bale carriage 29.

Figure 10:
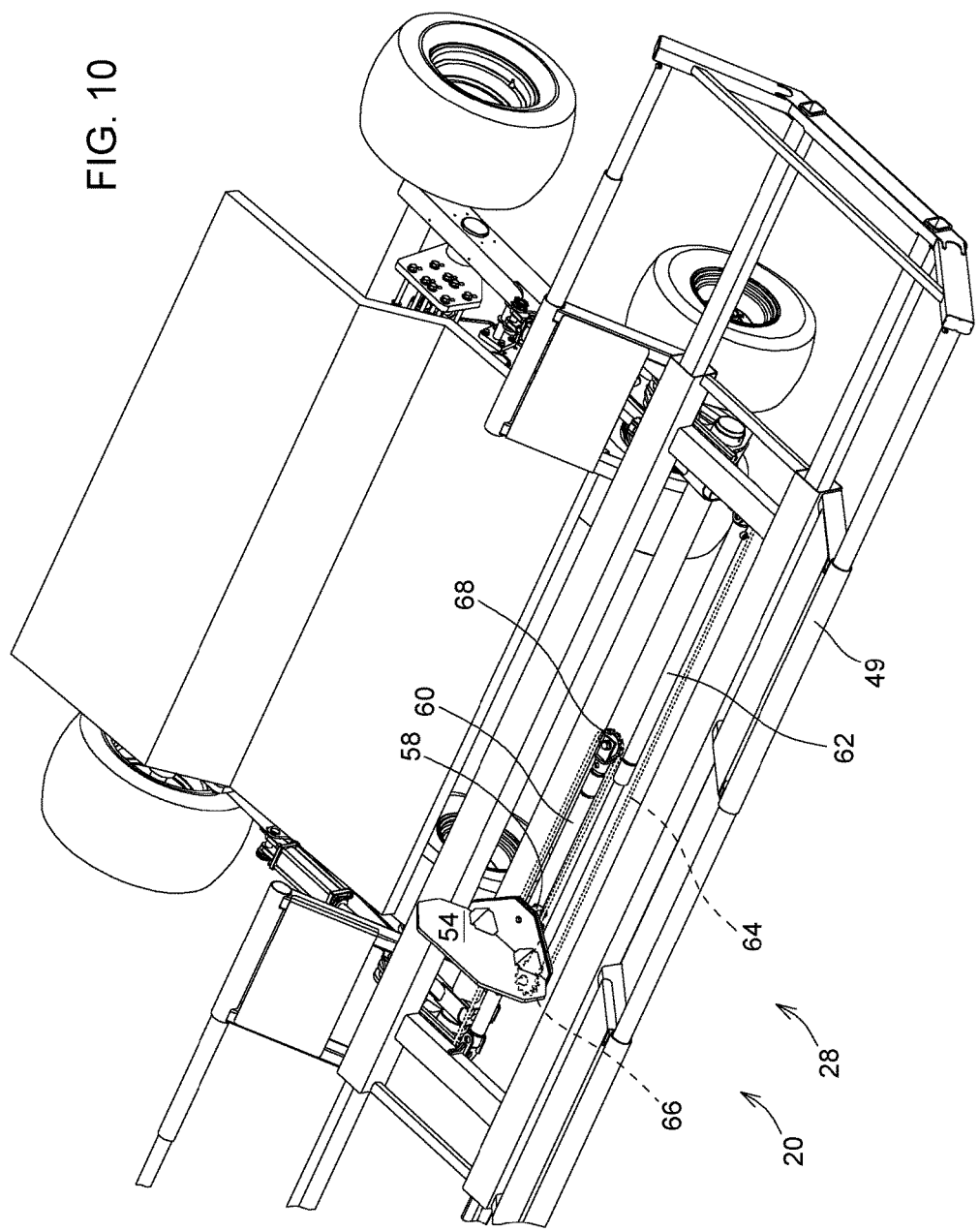
FIG. 10 is a partial perspective view of the sliding mechanism of the crop harvesting system of FIG. 1 with the floor of the bale carriage removed.
Figure 11:
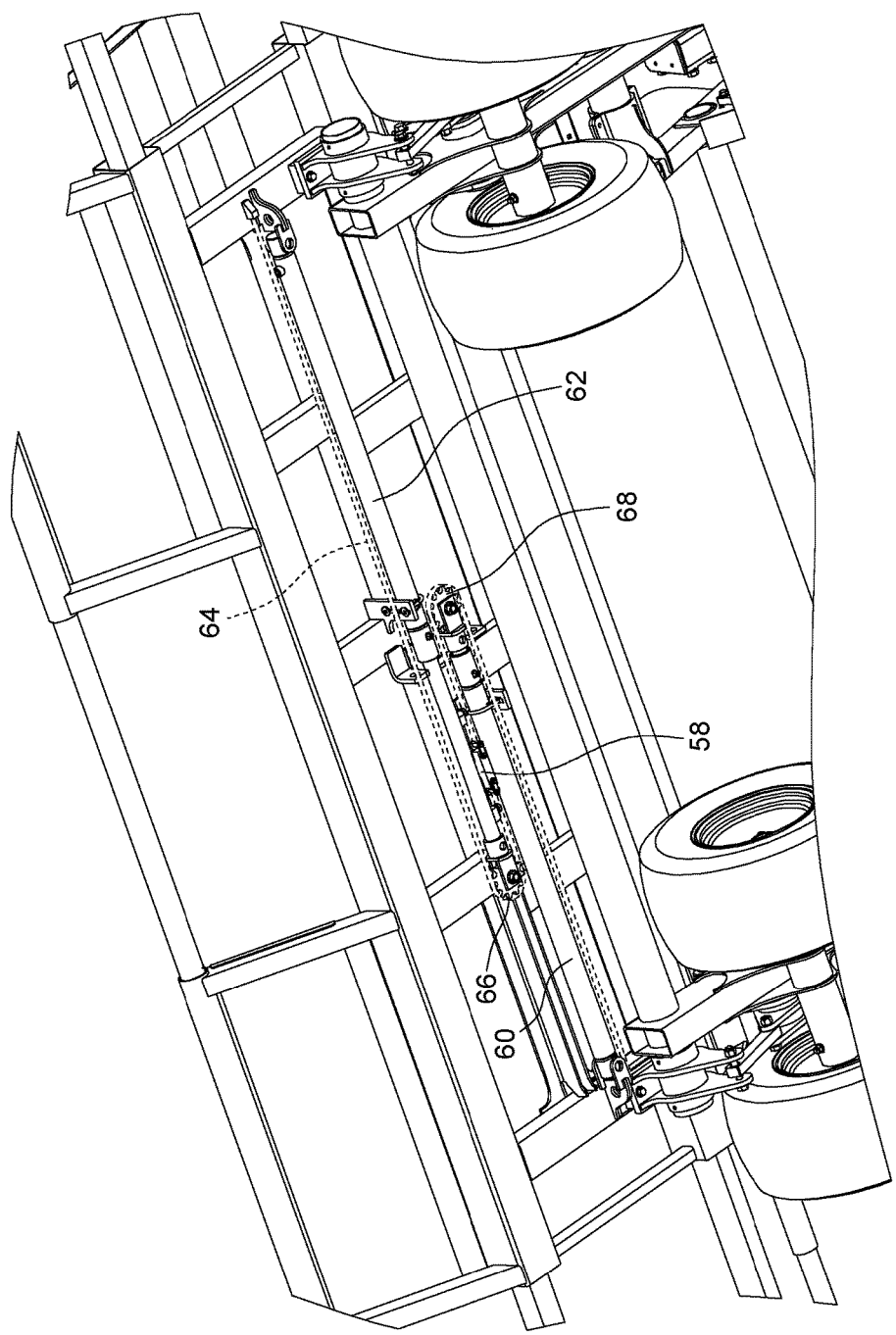
FIG. 11 is a partial perspective view from the underside of the baler showing a portion of the sliding mechanism of FIG. 10 with the floor of the bale carriage removed.

With reference to FIGS. 10 and 11, there is shown additional details of the sliding mechanism 54 by way of a partially-sectioned perspective view with the floor of the bale carriage 29 removed. The sliding mechanism 54 includes a pusher 58, movement devices 60, 62, a flexible link 64, and sprockets 66, 68. The movement devices 60, 62 are actuators and are shown here as hydraulic cylinders. Other movement devices 60, 62 are contemplated by this disclosure (e.g., electronic actuator). The flexible link 64 is shown as a chain, which engages the sprockets 66, 68. Ends of the flexible link 64 may be connected to the cylinder portion of the movement devices 60, 62 or to another portion of the carriage 28. The extension of the rods of the movement devices 60, 62 are coordinated to keep the flexible link 64 from developing undue slack. As the movement devices 60, 62 move at the same rates, the movement of the pusher 58 moves at a higher speed, and more specifically at twice the speed of the movement of the movement devices 60, 62. This advantageously allows movement devices to be generally half of the length (in their retracted position) as the distance traveled by pusher 58.

Referring to FIG. 12, there is shown a system 70 for controlling the speed of harvested crop as it is discharged from the crop accumulator 20. The system 70 comprises a speed measurement device 72 (e.g., speedometer, radar, GPS) for measuring forward travel speed of the crop accumulator 20. The speed measurement device 72 is illustrated as a GPS unit 74 in wired or wireless communication with a processor 76 which, can be connected to a display 78 in the operator station 15 of the tractor 12. The display 78 can include an alarm 79 that alerts an operator when harvested crop is discharged. It is contemplated that the alarm 79 may be audio, visual, vibratory, or other type of alarm. It is also contemplated that the alarm 79 may not be included in the display 78.

The processor 76 is illustrated as an ECU 80. In one embodiment, the processor 76 is in communication with the discharge mechanism 28 and the speed measurement device 72 and is operable to adjust the discharge mechanism 28, for imparting the desired rearward travel speed, and the forward travel speed of the crop accumulator 20, to discharge harvested crop with a rearward travel speed that is substantially equal to the forward travel speed such that the harvested crop has a substantially net zero speed as it contacts the ground.

The GPS unit 74 can be part of a cell phone or other device. The GPS unit 74 can be configured with at least one virtual trip line 82 that is communicated to the processor 76. Prior to commencing a baling operation an operator will determine the desired location(s) where he/she would like to deposit bales 23 for later recovery and storage. Selection of the deposit location(s) is generally made for the convenience of the operator considering, for example, such factors as the need to reduce soil compaction by reducing traffic on the field, proximity to the storage location, and the topography of the terrain (e.g., the desirability of depositing bales 23 at the top or bottom of a hill rather than on the side of a hill, the desirability of depositing bales 23 at the headlands, along ditches or grass waterways). The number and frequency of deposit locations along a baling path(s) is also limited by the crop yield versus the capacity of the crop accumulator 20. In other words, if a particular field or portion of a field has a higher yield of crop material, more crop will be fed into the baler 14 per unit traveled and thus more bales 23 will be completed over a shorter distance, thereby necessitating the establishment of virtual trip lines 82 that are closer together. Crop yield for a particular field and crop could be determined from historic yield data to generate a predicted crop yield that is stored in a look-up table 84 that is communicated to the ECU 80 or, for example, during the baling operation by monitoring the flow of crop into the baler 14 using appropriate sensors and/or by monitoring the number of bales 23 being produced per unit of distance an actual crop yield could be used. Once the operator has determined the desired deposit location(s) he or she will set in the GPS unit 78 the virtual trip line 82.

In another embodiment, the processor 76 is in communication with the discharge mechanism 28 and the speed measurement device 72 and is operable to adjust the discharge mechanism 28, for imparting the desired rearward travel speed, and the forward travel speed of the crop accumulator 20, to discharge harvested crop with a rearward travel speed that is one of proportional to the forward travel speed and substantially the same as the forward travel speed, such that the harvested crop contacts the ground on the virtual trip line 82, in a zone defined by a predetermined distance from the virtual trip line 82, and outside of a zone defined by a predetermined distance from the virtual trip line 82.

In yet another embodiment, the system 70 alerts an operator via the alarm 79 to adjust at least one of the discharge mechanism 28 to impart the rearward travel speed and the forward travel speed of the crop accumulator 20, to discharge harvested crop with a rearward travel speed that is at least one of proportional to the forward travel speed and substantially equal to the forward travel speed, such that the harvested crop has a substantially net zero speed as it contacts the ground.

The discharge mechanism 28 comprises the bale carriage 29 and the movement device 45. The discharge mechanism 28 is operable to selectively tilt the bale carriage 29 about the axis 44 (FIG. 13) to impart a desired rearward travel speed on the bales 23 as they are dumped onto the ground. The dumping of the bales 23 can commence with one, two, or three bales. The platform 56 may be configured to move in conjunction with the bale carriage 29 as the bale carriage 29 tilts to ensure that the middle bale is also dumped onto the ground with the desired rearward travel speed. The platform 56 may be coupled to the bale carriage 29 about a pivoting connection.

Advantageously, the present invention can extend extending sections 50, 51 by the action of sliding mechanism 54 as bale 23 is pushed onto either section 50 or section 51. This may be an action that occurs on the first use in a field or sections 50 and 51 may be spring loaded causing them to retract each time the bales are dumped from bale carriage 29. It is also contemplated that sections 50 and 51 may be extended manually or by an actuator (not shown). Additionally, the system 70 may sense a sideways tilt of baler 14 causing bale 23 to be moved to the uphill side of baler 14 (if that location is empty) to thereby improve stability.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Various features are set forth in the following claims.

What is claimed is:

1. A system for controlling the speed of a plurality of bales as they are discharged from a crop accumulator onto a field, the system comprising:
    a discharge mechanism configured to impart a desired rearward travel speed to the plurality of bales as they are being discharged from the crop accumulator in a side-by-side arrangement, wherein the discharge mechanism is a carriage assembly comprising a carriage and a hydraulic cylinder for moving the carriage;
    a speed measurement device configured to measure a forward travel speed of the crop accumulator as it moves at the forward travel speed greater than zero; and
    a processor in communication with the discharge mechanism and the speed measurement device, the processor operable to adjust at least one of the discharge mechanism for imparting the desired rearward travel speed and the forward travel speed of the crop accumulator, to discharge the plurality of bales with a rearward travel speed that is substantially equal to the forward travel speed such that the plurality of bales have a substantially net zero speed as they contact the ground and as the crop accumulator continues traveling at the forward travel speed.

2. The system of claim 1, further comprising a GPS unit configured with at least one virtual trip line that is communicated to the processor, such that the plurality of bales contact the ground according to at least one of the following: on the virtual trip line, adjacent to the virtual trip line, in a zone defined by a predetermined distance from the virtual trip line, and outside of a zone defined by a predetermined distance from the virtual trip line.

3. The system of claim 1, wherein the speed measurement device is one of a GPS unit, a speedometer, and a radar.

4. The system of claim 3, wherein the GPS unit is a cellular phone.

5. The system of claim 1, further comprising an alarm that alerts an operator when the plurality of bales are discharged.

6. A system for controlling the speed of a plurality of bales as they are discharged from a crop accumulator onto a field, the system comprising:
    a discharge mechanism configured to impart a desired rearward travel speed to the plurality of bales as they are being discharged from the crop accumulator in a side-by-side arrangement, wherein the discharge mechanism is a carriage assembly comprising a carriage and a hydraulic cylinder for moving the carriage;
    a speed measurement device configured to measure a forward travel speed of the crop accumulator as it moves at the forward travel speed greater than zero;
    a GPS unit configured with at least one virtual trip line; and
    a processor in communication with the discharge mechanism, the speed measurement device, and the GPS unit, the processor operable to adjust at least one of the discharge mechanism for imparting the desired rearward travel speed and the forward travel speed of the crop accumulator, to discharge the plurality of bales with a rearward travel speed that is substantially the same as the forward travel speed, such that the plurality of bales contact the ground according to at least one of the following: on the virtual trip line, adjacent to the virtual trip line, in a zone defined by a predetermined distance from the virtual trip line, and outside of a zone defined by a predetermined distance from the virtual trip line.

7. The system of claim 6, wherein the speed measurement device is one of a speedometer and a radar.

8. The system of claim 6, wherein the GPS unit is a cellular phone.

9. The system of claim 6, further comprising an alarm that alerts an operator when the plurality of bales are discharged.

10. The system of claim 6, wherein the speed measurement device and the GPS unit are the same device.

* * * * *